United States Patent [19]

Creek et al.

[11] Patent Number: 4,515,747

[45] Date of Patent: May 7, 1985

[54] REMOTELY OPERATED MAINTENANCE AND INSPECTION EQUIPMENT TRANSPORTER

[75] Inventors: Ronald B. Creek; Charles T. Harden, both of Chattanooga; Harold H. Harris, Harrison, all of Tenn.

[73] Assignee: Combustion Engineering, Inc., Windsor, Conn.

[21] Appl. No.: 423,953

[22] Filed: Sep. 27, 1982

[51] Int. Cl.³ .............................................. G21C 17/00
[52] U.S. Cl. ................................... 376/249; 376/250; 165/11 R
[58] Field of Search ............. 376/249, 250; 165/11 R, 165/11 A

[56] References Cited

U.S. PATENT DOCUMENTS

| | | | |
|---|---|---|---|
| 3,511,091 | 5/1970 | Thome | 376/249 |
| 3,934,731 | 1/1976 | Muller et al. | 376/250 |
| 3,954,136 | 5/1976 | Gugel | 376/250 |
| 3,964,293 | 6/1976 | Faure et al. | 376/250 |
| 3,988,922 | 11/1976 | Clark et al. | 376/249 |
| 4,018,344 | 4/1977 | Leshem | 165/11 A |
| 4,205,939 | 6/1980 | Reyes | 165/11 A |
| 4,336,104 | 6/1982 | Figlhuber et al. | 376/249 |
| 4,416,846 | 11/1983 | Kastl et al. | 376/249 |
| 4,432,931 | 2/1984 | Lockett | 376/249 |
| 4,460,920 | 7/1984 | Weber et al. | 165/11 A |

Primary Examiner—Sal Cangialosi
Attorney, Agent, or Firm—Arthur L. Wade

[57] ABSTRACT

A wheeled transporter is placed at the periphery of the tube bundle which extends up from its tube sheet within a nuclear steam generator shell. The transporter is formed in hinged sections which can be disengaged as required at the periphery of the tube bundle. A cable attached to each end of the transporter extend through the handholes for movement of the transporter along the bundle periphery. Pistons on the transporter are controlled remotely to extend into engagement with the internal wall of the generator shell to selectively immobilize the transporter at any desired peripheral position and thereby form a steady base for maintenance and inspection devices mounted on the transporter.

3 Claims, 5 Drawing Figures

REMOTELY OPERATED MAINTENANCE AND INSPECTION EQUIPMENT TRANSPORTER

TECHNICAL FIELD

The present invention relates to a mechanism for mounting and transporting inspection and/or maintenance apparatus and moving these devices over the area of a nuclear steam generator tube sheet to clean and inspect the tubes as they extend up from the tube sheet. More specifically, the invention relates to a transporter for inspection and/or maintenance apparatus, which transporter has been inserted into the confined space at the periphery of the tube bundle and within the internal wall of the nuclear steam generator.

BACKGROUND ART

A typical nuclear steam generator comprises a vertically oriented shell, a plurality of U-shaped tubes disposed in the shell so as to form a tube bundle, a tube sheet for supporting the tubes at the ends opposite their U-like curvature, a dividing plate which is arranged with the tube sheet to form a primary fluid inlet header at one end of the tube bundle and a primary fluid outlet header at the other end of the tube bundle, a primary fluid inlet nozzle in fluid communication with the primary fluid inlet header and a primary fluid outlet nozzle in fluid communication with the primary fluid outlet header. The steam generator also comprises a wrapper sheet disposed between the tube bundle and the shell to form an annular chamber with the internal wall of the shell, and a feedwater ring disposed above the U-line curvature end of the tube bundle. The primary fluid having been heated by circulation through the reactor core enters the steam generator through the primary fluid inlet nozzle. From the primary fluid inlet nozzle, the primary fluid flows through the primary fluid inlet header, through the tubes of the bundle, out the primary fluid outlet header, through the primary fluid outlet nozzle to the remainder of the reactor coolant system. At the same time, feedwater is introduced to the steam generator through the feedwater ring. The feedwater is directed down the annular chamber adjacent to the shell until the tube sheet near the bottom of the annular chamber causes the feedwater to reverse direction passing in heat transfer relationship with the outside of the U-shaped tubes of the bundle and up through the inside of the wrapper. While the feedwater is circulating in heat transfer relationship with the tubes of the bundle, heat is transferred from the primary fluid in the tubes to the feedwater over the outside of the tubes, causing some predetermined portion of the feedwater to be converted to steam. The steam then rises and is circulated through typical electrical generating equipment producing electricity in a manner well-known in the art.

Since the primary fluid contains radioactive particles and is isolated from the feedwater only by the walls of the U-shaped tubes which may be constructed from Inconel, the U-tube walls form part of the primary boundary for isolating these radioactive particles. It is, therefore, important that the U-tubes be maintained defect-free so that no ruptures will occur in the U-tubes. However, experience has shown that under certain conditions the U-tubes may develop leaks therein which allow radioactive particles to contaminate the feedwater, a highly undesirable accident.

There is thought to be several causes of tube leaks in steam generators. One cause of these leaks is considered to be related to the chemical environment on the feedwater side of the tubes. Analysis of tube samples taken from operating steam generators which have experienced leaks has shown that the leaks were caused by cracks in the tubes resulting from intergranular corrosion. High caustic levels found in the vicinity of the cracks in the tube specimens taken from operating steam generators, and the similarity of these cracks to failures produced by caustic under controlled laboratory conditions, have identified high caustic levels as a cause of the intergranular corrosion and thus the cause of the tube cracking.

Another cause of tube leaks is inferred to be from tube thinning. Eddy current tests of the tubes have indicated that the thinning occurs on the tubes near the tube sheet at levels corresponding to the levels of sludge that has accumulated on the tube sheet. The sludge is mainly iron oxides and copper compounds along with traces of other metals that have settled out of the feedwater onto the tube sheet. The level of sludge accumulation may be inferred from eddy current testing with a low frequency signal that is sensitive to the magnetite in the sludge. The correlation between sludge levels and tube wall thinning locations strongly implies that the sludge deposits provide a site for concentration of a phosphate solution or other corrosive agents at the tube wall that result in tube thinning.

Further, more recent experience has discovered that tube failures are brought about by stress corrosion, cracking and pitting. As a matter of fact, pitting was the only problem identified by the Assignor of this Application at Millstone II.

Regardless of the specific reason for tube failure in the area above the tube sheet. the present invention is concerned with the removal of the so-called sludge which has certainly been pinned down as creating an environment for attack on the tubes. It is this material which must be liquified by having fluid directly injected into it, preparatory to being flushed from the tube sheet. One known method for removal of this sludge is referred to as sludge lancing. Sludge lancing includes using high pressure water to break up and slurry the sludge in conjunction with suction and filtration equipment that removes the water/sludge mixture for disposal or recirculation. An excellent discussion of the background of this system is disclosed in U.S. Pat. No. 4,079,701, Robert A. Hickman, et al., issued Mar. 21, 1978. All of the problems of this system center ground the removal of sludge by the mechanical arrangement of lance manipulation to drive the sludge into a suction header. If a transport apparatus can be moved into the confined space at the periphery of the tube bundle, a sludge lance can be mounted on the transporter and manipulated as required to fluidize the sludge in preparation for its removal.

The present problem is in moving the transport apparatus into the limited area between the periphery of the tube bundle and the internal wall of the shell. Once the transporter has been moved into position at the bundle periphery, another problem is movement of the transporter along the periphery and periodic immobilization of the transporter to facilitate manipulation of the sludge lance and/or inspection apparatus mounted on the transporter.

DISCLOSURE OF THE INVENTION

The present invention contemplates a transport apparatus, having multiple parts readily disassembled and assembled, inserted into the limited area between the tube bundle and shell wall of a nuclear steam generator.

The invention further contemplates control and power lines extended through access openings in the shell of the steam generator to connect with the transporter and actuate extensible members on the transporter which are in engagement with the internal wall of the shell.

The invention further contemplates a sludge lance mounted on the transporter, as a base, to be manipulated remotely in breaking up sludge accumulated on the tube sheet and about the tubes of the bundle.

Other objects, advantages, and features of the invention will become apparent to one skilled in the art upon consideration of the written specification, appended claims and accompanying drawings.

BRIEF DESIGNATION OF THE DRAWINGS

BEST MODE FOR CARRYING OUT THE INVENTION

Terms and Technology

Figure 1:
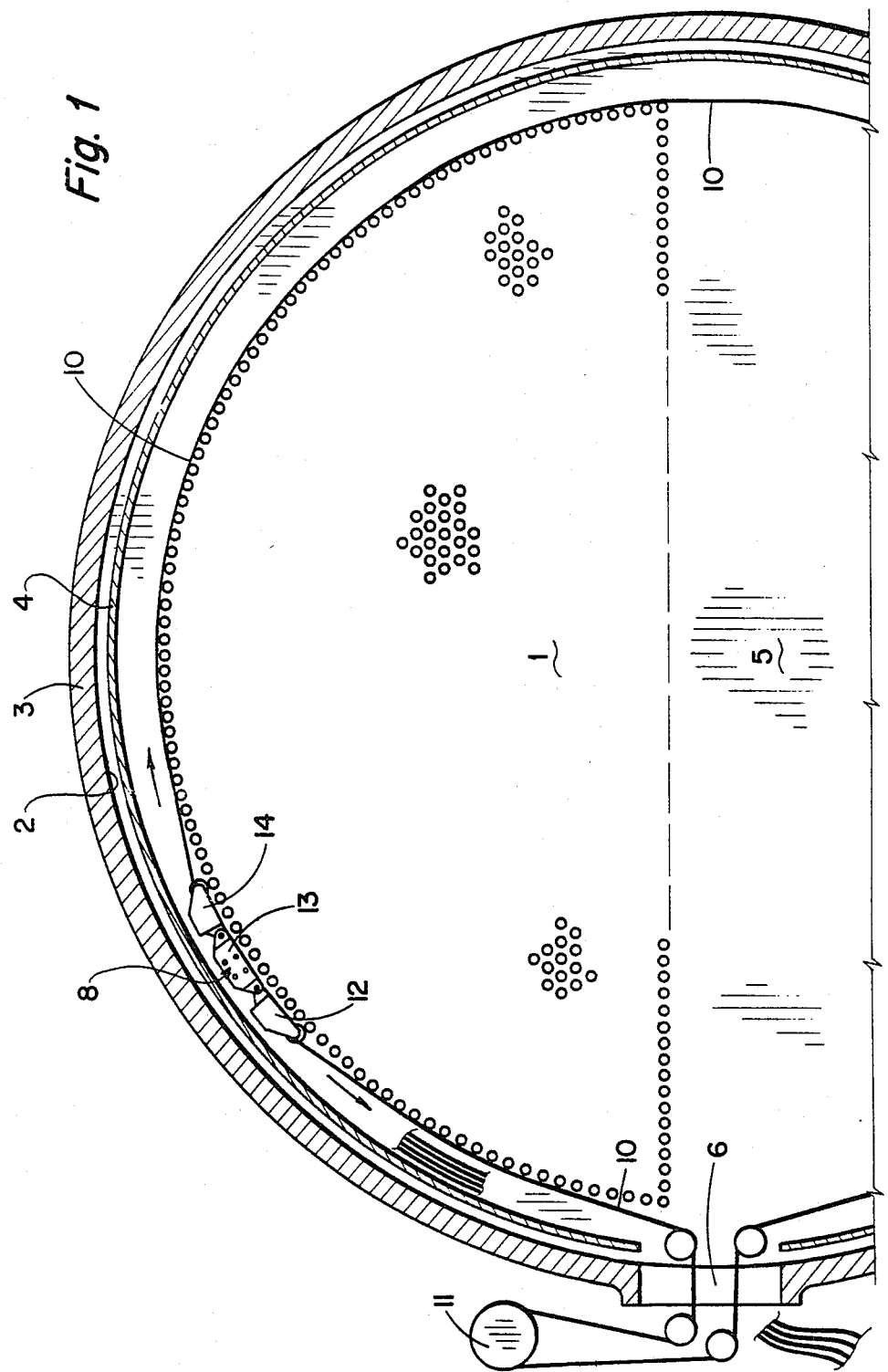
FIG. 1 is a sectioned plan view of part of the tube sheet of a nuclear steam generator with a transporter embodying the present invention positioned at the periphery of the tube bundle.

In referring to a nuclear steam generator, it is reasonable to simply describe it as a tube and shell heat exchanger in which hot fluid is passed in indirect contact with water to produce steam which, in turn, can be utilized to actuate a turbine to produce electrical energy. In further detail, the steam generator/heat exchanger is a vessel in which is mounted a bundle of tubes with which a primary fluid, heated by nuclear energy, is passed in indirect heat exchange with feedwater flowed over the outside of the tubes of the bundle. Present attention is focused on the surface of the tube sheet from which the tubes of the bundle are extended upwardly. The external sides of these tubes are attacked by corrosive agents precipitating from the feedwater and collected as sludge around the tubes and above the tube sheet. A maintenance program must be developed to remove the sludge and inspect the surface of the tubes for damage.

The flow pattern of feedwater over the tubes of the bundle is controlled by baffling within the vessel. The more important of these baffle structures is referred to as a wrapper which usually extends down from the upper regions of the vessel to within the order of 15" of the tube sheet. Incoming feedwater flows down the annulus, as a downcomer formed between this wrapper and the inside of the vessel, and is released above the tube sheet to flow laterally to the tubes and up over the tubes of the bundle. At this location on the tube sheet and below the lower edge of the wrapper, a transporter is placed in which the present invention is embodied.

The transporter is a conveyance which is adapted to move along the periphery of the tube bundle within the limited space provided between the bundle, the upper surface of the tube sheet, the inside wall of the vessel shell, and the lower edge of the wrapper. The conveyance may mount a nozzle system which characterizes the transporter as a sludge lance which discharges streams of water down the tube rows. Also, the transporter may have inspection devices mounted on it to transform the transporter into an inspection probe for the evaluation of damage and defects resulting from chemical attack on the tubes and/or their tube sheet.

The transporter is brought into the limited space at the periphery of the tube bundle through openings of limited size. Realistically, there are only two routes the transporter can utilize to reach its position on the tube sheet. First, the transporter can be taken down the annulus between the wrapper and the inside wall of the shell. This annulus is in the order of 3" wide. The transporter can be alternatively inserted through apertures in the side of the shell, generally referred to as handholes.

Given the limited size of the handhole, the transporter is assembled in sections, joined by hinges which can be points of disassembly and assembly of the sections. The present design anticipates the assembled sections of the transporter being wormed into the limited space at the periphery of the tube bundle through the handhole. Once in position, within the limited space at the tube bundle periphery, the equipment for inspection and maintenance is mounted on the transporter. It is also anticipated that when the transporter is in its operative position on the tube sheet, it will be connected to outside control and manifesting devices through control lines extending through the handhole in the side of the shell. Thereafter, the transporter can be controlled to move along the periphery of the tube bundle and carry out its participation in the process of removing the sludge with its corrosive chemical elements, or providing an evaluating view of the surface of the tubes and the surface of the tube sheet.

The Shell, Tube Bundle and Transporter

FIG. 1 is an unpretentious disclosure of the cramped, limited space available between tube bundle 1 and the inside wall 2 of shell 3 beneath the lower edge of tube wrapper 4 and above the surface of the tube sheet 5. Access to this space is provided by handhole 6 through shell 3.

As disclosed in FIG. 1, transporter 8 is positioned in this peripheral path about the tube bundle 1. The transporter 8 is made up of parts which link to each other through quick disconnect hinges. Each end of the transporter is attached to an endless cable 10 that extends outward from the handhole and is wrapped around a powered drum 11. By rotation of drum 11, transporter 8 is pulled along the periphery of bundle 1 to take up predetermined positions at which the instruments mounted on the transporter may carry out their functions of inspection and/or maintenance.

The functions of the various inspection and maintenance structures mounted on the transporter need not be discussed. It is adequate to point out that the transporter is an operative base for these devices. The devices may comprise a T.V. camera to enable visual inspection to be made of the tubes of bundle 1. A sludge lance may be mounted upon the transporter 8 to break up and liquify deposits at the base of the tubes of bundle 1. In short, any number, or combination, of instruments may be mounted on transporter 8 and moved by it to predetermined operative positions with the transporter as a stable base. The present invention is embodied in the transporter 8, its means for disassembly and assembly, and its means to stabilize it at any desired position along the periphery.

Zoom In On The Transporter

Figure 2:
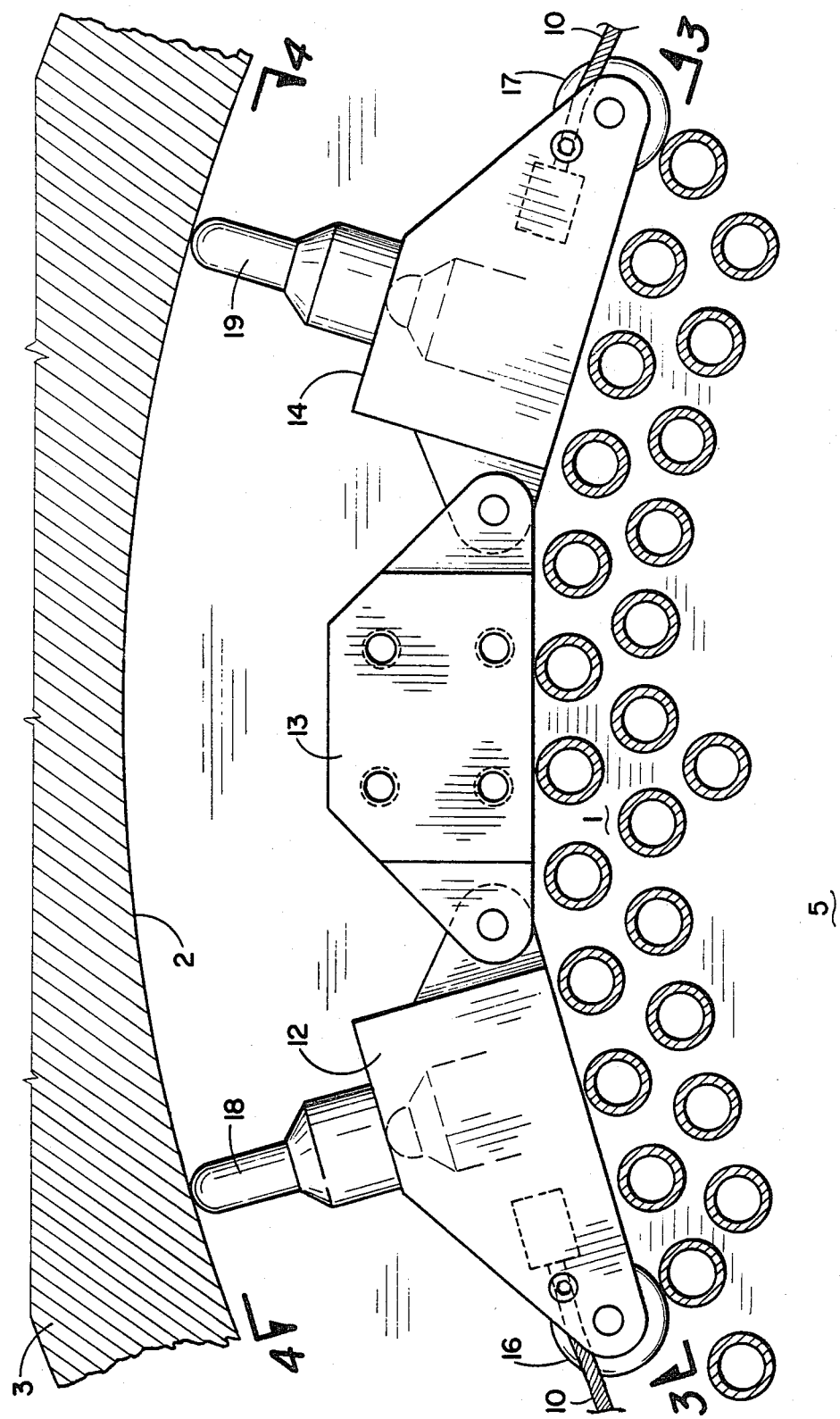
FIG. 2 is an enlarged plan view of the transporter of FIG. 1.

FIG. 2 moves the observer of FIG. 1 closer to the transporter 8 to emphasize the details of connection between the transporter parts. Further, those parts of the transporter brought into direct contact with the tubes of bundle 1 and the inside wall 2 of shell 3 are disclosed in greater detail.

The transporter 8 is disclosed here in three basic parts, 12, 13 and 14. It is the middle part 13 which functions as the platform or base on which the inspection and maintenance devices are to be mounted and transported. On each end of the base 13, are connected end parts 12 and 14. It is on these end parts which are mounted the wheels engaging the upper surface of the tube sheet 5, the structure engaging the outer tubes of bundle 1, the pistons which extend out into engagement with wall 2, and the connections for the cable by which the entire transporter is traveled around the bundle periphery.

In this plan view of FIG. 2, the end parts 12 and 14 can each be seen as having wheels 16 and 17 in contact with the outer tubes of bundle 1. On the other side of the parts 12 and 14 are telescoping pistons 18 and 19 shown as extended into engagement with wall 2. Extended, as pistons 18 and 19 are shown, the transporter is anchored in position between the tube bundle 1 and wall 2. If control is exerted over these pistons to retract them, the transporter 8 is released to be pulled around the periphery of bundle 1.

When the transporter is pulled to any position from which it is desired to inspect or service the tubes of bundle 1 and their tube sheet 5, the pistons 18 and 19 are extended, as shown in FIG. 2. The transporter then becomes locked, fixed, or anchored at the new position so that device-bearing part 13 may form a firm base of operations. Of course, in transport around the periphery, wheels 16 and 17 provide rolling contact between the transporter and the outside tubes of bundle 1. Finally, cable 10 is disclosed as fixed to the end parts 12 and 14 for the movement of the transporter.

Transporter From The Sides

Figure 3:
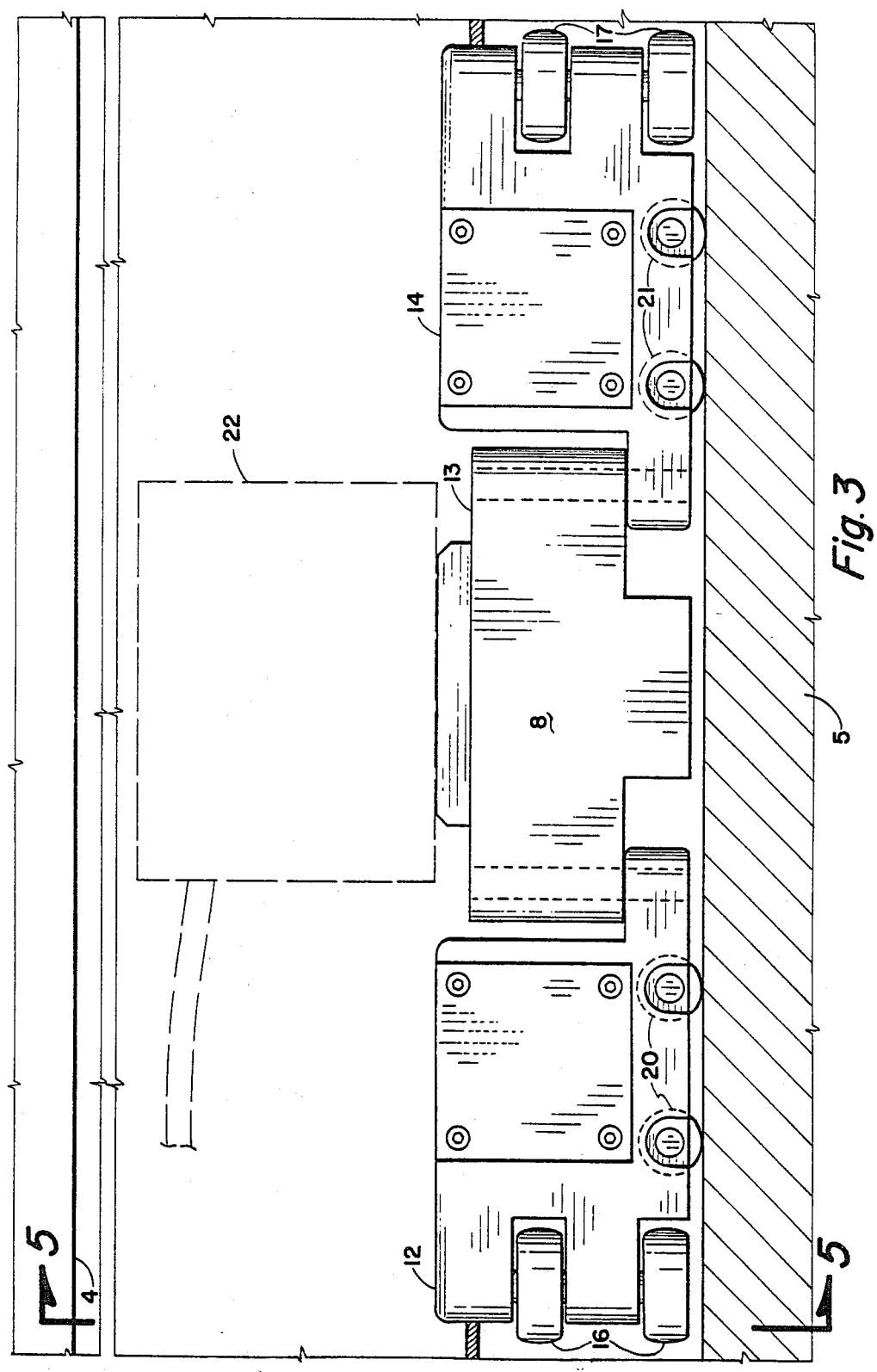
FIG. 3 is an elevation view of the transporter in the direction of lines 3—3 of FIG. 2.
Figure 4:
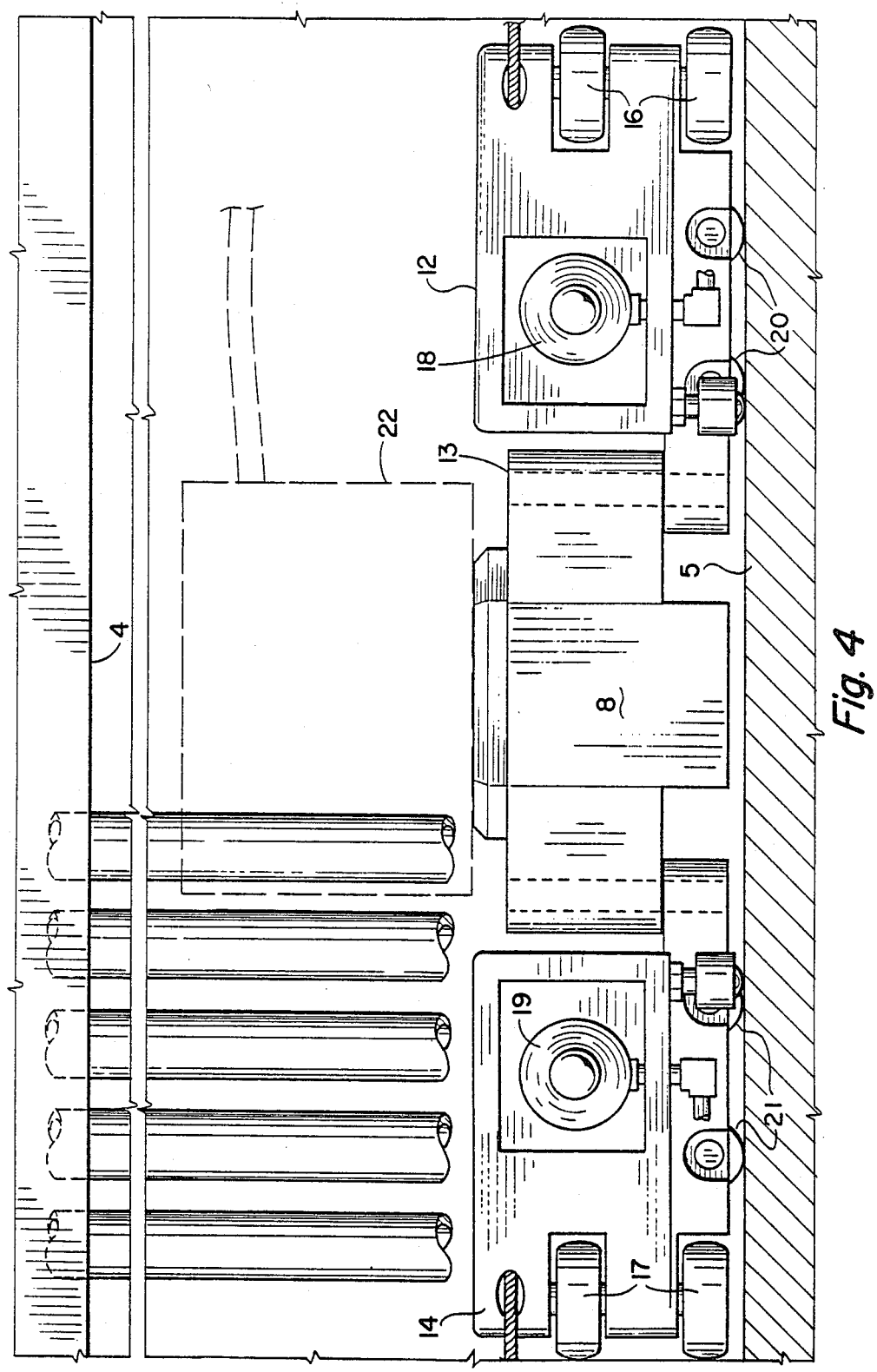
FIG. 4 is an elevation of the transporter in the direction of lines 4—4 of FIG. 2.

FIGS. 3 and 4 each provide an elevation view of a side of transporter 8 as it rests on the upper surface of tube sheet 5 and engages the tubes of bundle 1. The three parts, 12, 13 and 14, are identifiable, joined by their quick-couple hinges. Incidentally, it should be obvious that these hinges between the parts permit a generous lateral movement of the parts relative to each other to accommodate the curvature in the peripheral path about bundle 1.

FIG. 3 provides a view from outside bundle 1 toward the transporter. The lower edge of wrapper 4 is a prominant feature of FIGS. 3 and 4 in showing how the transporter clears this lower edge as the transporter is moved on its two sets of wheels 20 and 21. Wheel set 20 is mounted on part 12, while wheel set 21 is mounted on part 14. The specific arrangement of the wheels of these sets 20 and 21 must provide stability as they engage and move with rolling contact on the upper surface of tube sheet 5.

FIG. 3 discloses wheels 16 and 17 as they extend from their mountings on the end pieces to engage the outside tubes of bundle 1. Pistons 18 and 19 are on the side away from the viewer in FIG. 3. Device 22 is disclosed as mounted on transporter part 13 in both FIGS. 3 and 4 to represent any and all instruments and devices to be mounted on transporter 8 and operated from control lines extended out the handhole.

Finally, FIG. 4 provides a view of pistons 18 and 19 as extended toward the viewer. Of course, in this FIG. 4, the bundle-contacting wheels 16 and 17 are also in view.

A View From The End

Figure 5:
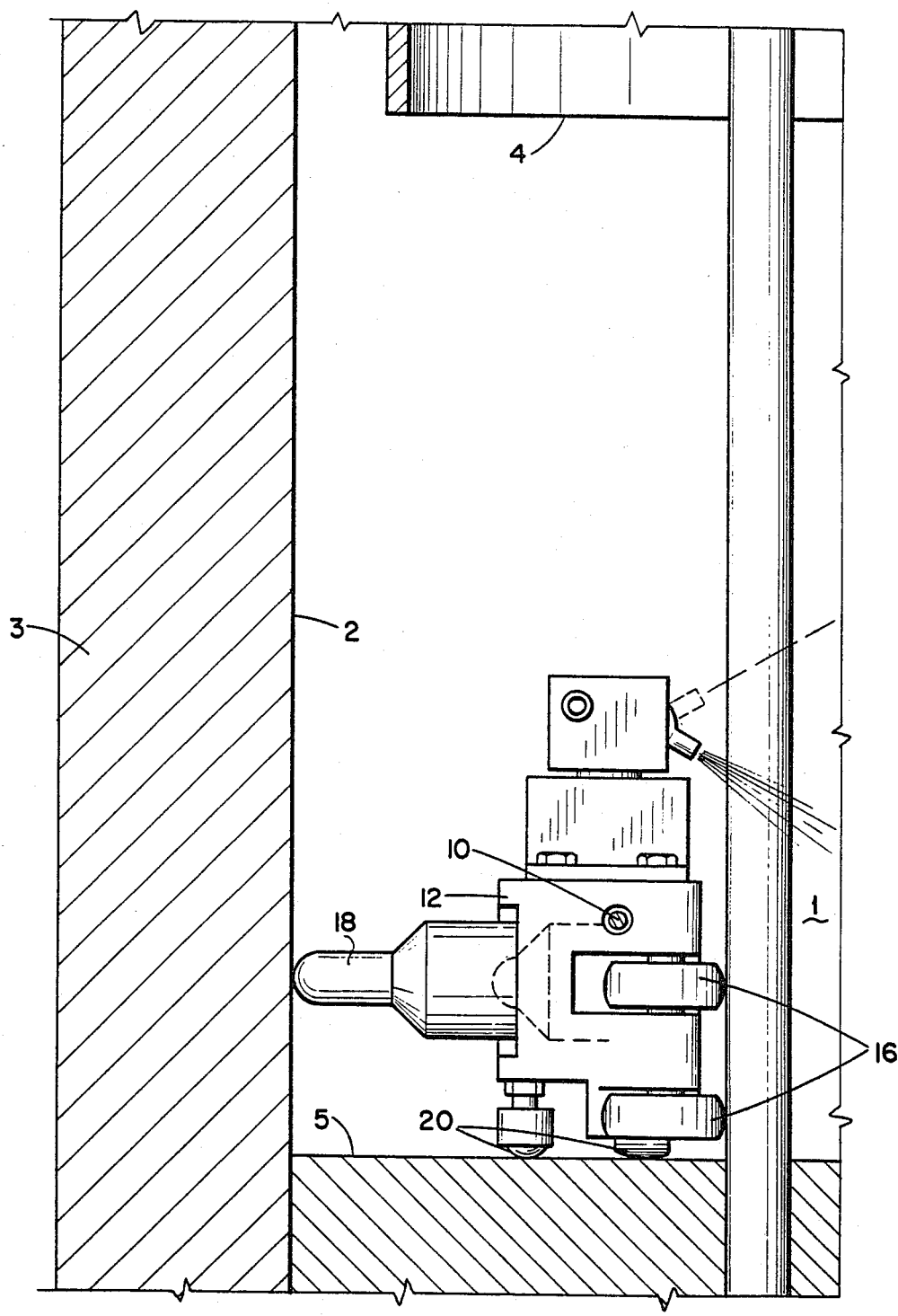
FIG. 5 is an end elevation of the transporter in the direction of lines 5—5 of FIG. 3.

FIG. 5 completes the pictorial impact of the embodiment upon the viewer. This sectioned elevation discloses the transporter 8 from the end of part 12. The transporter 8 is nestled within the confined space defined by the upper surface of tube sheet 5, the shell 3, the bundle 1, and the lower edge of wrapper 4. Assembled within this confined space, the transporter 8 is stabilized at its peripheral position by the extension of piston 18 pushing the transporter end part 12 against the outer tubes of bundle 1. Wheels 16, mounted on part 12, specifically engage the outer tubes of the bundle. Therefore, the transporter is captured between the tubes and the surface of inside wall 2 of shell 3. The equipment mounted on the middle part 13 of the transporter projects upward toward the lower end of the wrapper, from which position it services and inspects the tubes of bundle 1 and their sheet, (disclosed in FIGS. 3 and 4).

Conclusion

For all the extensive drawing disclosure, the invention is embodied in the comparatively simple structure of transporter 8. The drawing disclosure is extensive in order to teach the elaborate environment which defines the limited space into which the assembled transporter must be moved for subsequent movement and stabilization. The end result is basically a three-part transportation device moved upon its sheels, by remote manual control, over the surface of the upper side of the tube sheet while contacting the tubes on the outer edge of bundle 1. The transporter is periodically wedged into a predetermined position between the wall of tubes and the inside surface of the shell to perform its function by the support of selected instruments and devices mounted on the mid-part of the transporter. After its function is performed, the transporter is pulled by its cable to the handhole, disassembled at the hinge/latches between the parts, and removed piece-by-piece through the handhole.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawing is to be interpreted in an illustrative and not in a limiting sense.

We claim:
1. In a steam generator of a nuclear power installation wherein the generator is essentially a heat exchanger having a shell across the lower portion of which extends a horizontal tube sheet supporting a bundle of vertically extending tubes and surrounded by a wrapper extending downward from the upper portion of the shell to form an annulus with the inside of the shell and terminating a predetermined distance above the tube sheet, a system for cleaning and inspecting that portion of the tubes a predetermined distance above the tube sheet, including,
   an opening to the annulus through the shell of the heat exchanger,
   a transporter structure which can be disassembled and passed through the shell opening to a position beneath the lower end of the bundle wrapper and between the tube bundle and the internal wall of the shell where it is reassembled,
   first wheel structures mounted on the transporter arranged to engage the upper surface of the tube sheet,
   a cable connected to the ends of the transporter and extending around the periphery of the tube bundle and through the shell opening to a motor means operated externally to move the transporter along the periphery of the tube bundle,
   inspecting and cleaning structure mounted on the transporter for removing foreign matter from the tube portions above the tube sheet and inspecting the cleaned tubes,
   and extension structure mounted on the transporter and controlled in lateral movement to engage the inside of the shell wall and the tubes of the bundle for efficient operation of the inspection and cleaning structure mounted on the transporter.

2. The system of claim 1, including,
   a second set of wheels mounted on the transporter to extend into lateral engagement with the tubes of the bundle as the transporter is moved along the periphery of the bundle.

3. The system of claim 1, including,
   control means positioned external of the shell connected to the transporter for remotely operating the extension structure and the inspecting and cleaning structure mounted on the transporter.

* * * * *